US012793484B2

(12) United States Patent
Viswanathan

(10) Patent No.: US 12,793,484 B2
(45) Date of Patent: Nov. 10, 2026

(54) METHODS AND SYSTEMS OF GUARANTEED DIGITAL KEY CODE DELIVERY TO A SMART LOCK IN A SMART-DEVICE NETWORK

(71) Applicant: Narayanaswamy Viswanathan, Plano, TX (US)

(72) Inventor: Narayanaswamy Viswanathan, Plano, TX (US)

( * ) Notice: Subject to any disclaimer, the term of this patent is extended or adjusted under 35 U.S.C. 154(b) by 159 days.

(21) Appl. No.: 18/234,367

(22) Filed: Aug. 15, 2023

(65) Prior Publication Data

US 2024/0169775 A1 May 23, 2024

Related U.S. Application Data

(60) Provisional application No. 63/532,904, filed on Aug. 15, 2023, provisional application No. 63/398,218, filed on Aug. 15, 2022.

(51) Int. Cl.
*G07C 9/00* (2020.01)

(52) U.S. Cl.
CPC ..... *G07C 9/00309* (2013.01); *G07C 9/00571* (2013.01); *G07C 9/00904* (2013.01); *G07C 2009/00388* (2013.01); *G07C 2209/62* (2013.01)

(58) Field of Classification Search
CPC ............ G07C 9/00309; G07C 9/00571; G07C 9/00904; G07C 2009/00388; G07C 2209/62
USPC .................................................. 340/5.7, 5.72
See application file for complete search history.

(56) References Cited

U.S. PATENT DOCUMENTS

| | | | | |
|---|---|---|---|---|
| 7,012,503 | B2 * | 3/2006 | Nielsen | G07C 9/27 340/5.6 |
| 7,114,178 | B2 * | 9/2006 | Dent | H04W 12/06 726/4 |
| 8,723,641 | B2 * | 5/2014 | Sadighi | G08C 17/02 340/5.2 |
| 10,492,067 | B2 * | 11/2019 | Kennedy, Jr. | H04L 63/068 |
| 10,540,835 | B2 * | 1/2020 | Kuenzi | G07C 9/29 |
| 11,295,565 | B2 * | 4/2022 | Sun | G07C 9/00571 |
| 2011/0082882 | A1 * | 4/2011 | Denison | G07F 9/001 707/E17.014 |
| 2014/0120905 | A1 * | 5/2014 | Kim | H04W 4/80 455/426.1 |
| 2016/0116510 | A1 * | 4/2016 | Kalous | G07C 9/00571 340/636.1 |
| 2017/0270723 | A1 * | 9/2017 | He | G07C 9/29 |

FOREIGN PATENT DOCUMENTS

| | | | | |
|---|---|---|---|---|
| WO | WO-2005078667 A1 * | 8/2005 | | G07C 9/00182 |

* cited by examiner

*Primary Examiner* — Nam V Nguyen

(57) ABSTRACT

In one aspect, a computerized method for guaranteed key delivery of a digital key code to a smart lock comprising: providing a plurality of smart locks, wherein the plurality of smart locks are communicatively coupled in a local area network, and wherein a key code; transmitting, via the local area network, a digital key code to a smart lock in the plurality of smart locks; and verifying a presence of the transmitted code in the lock once the transmission is performed.

12 Claims, 13 Drawing Sheets

FIGURE 7
PMS
Ticket Mgmt
Connect To Business Systems
Business Solutions
API
Manage
Monitor
Discover
Resolve
Predict
Secure
Security
Tools
Repository
Connect To Devices
devicethread
Admin
700

1000

1100

1200

METHODS AND SYSTEMS OF GUARANTEED DIGITAL KEY CODE DELIVERY TO A SMART LOCK IN A SMART-DEVICE NETWORK

CLAIM OF PRIORITY

This patent application claims priority to U.S. Provisional Patent Application No. 63/398,218 filed on 15 Aug. 2022. This provisional patent application is hereby incorporated by reference in its entirety.

This patent application claims priority to U.S. Provisional Patent Application No. 63/532,904 filed on 15 Aug. 2023. This provisional patent application is hereby incorporated by reference in its entirety.

BACKGROUND

Hotels and short-term rentals struggle to manage smart devices can be mostly implemented as part of point solutions. To save money, improve guest experiences or be compliant with safety laws IT services companies for hospitality lack unified view of the digital infrastructure across a portfolio Property GM and management companies lack operational visibility to use smart infrastructure. Current solutions are fragmented, costly, functionally deficient, and non-scalable across a portfolio.

Smart devices for the most part are battery powered. In order for the devices to become part of a "real time" platform, it is essential that the status of the device (online/offline or other status as specific to the particular device) needs to be known. Depending on the device, the manner in which they connect to the network varies (e.g. Zigbee, ZWave, Lorawan, Wi-Fi and/or Bluetooth). Querying the status on a high frequency will have an adverse impact on the life of the battery. Not querying the status frequently means that the status of the device in "real time" becomes impossible to determine. Hubs such as Samsung SmartThings automatically set status query intervals to be high in order to conserve battery life. This that unless a device is queried by an end user, its status is only updated on the periodicity (once in several minutes or hours). This can render any platform which relies on third party hubs such as SmartThings, incapable of producing the real-time status of connected devices.

Devices at the edge connect in one of the following ways to a "controller": to a local hub; directly to the cloud through Wi-Fi, and to a cloud controller through the local hub; etc. If Wi-Fi connectivity is lost, the devices are no longer controllable. A second major challenge is that policies cannot be instantly applied to the edge devices since there is a period of time that it takes for the instructions to traverse from the cloud through the hub to the device. Current hubs and cloud software do not provide a solution to this challenge, relying instead on the fact that connectivity will not be lost, or on an alternative backup route such as LTE. Further, they expect a minimum period of time to elapse between a change in policy (e.g. the code to open a lock) before such a code is applied on the device.

When new key codes are generated, software transmits these codes to the connected locks. Sometimes locks are temporarily not connected to the network. If the codes are transmitted at this time, the transmitting software assumes that it has successfully transmitted to the code. However if the lock was temporarily not connected to the network, then it would not receive the code. This would lead to situations where the code is not in the lock. It is estimated that this happens roughly one in ten transmissions. Current solutions in the market have no solution to this problem merely asking for the code to be retransmitted.

If a code is repeatedly entered in a property that is being managed OR if a code (such as the master code) OR the staff code is used outside of hours when they should be used, it is necessary to raise an alert notification. Current solutions do not have a configurable way to activate other security aspects if a wrong code is repeatedly attempted.

IoT devices can be vulnerable to hacking. It is difficult to keep them secure using current approaches. As short-term rentals grow, they require the internal network to be more secure than ever. Property owners are not equipped with knowledge or tools to manage and secure their network remotely. This leaves the network vulnerable and open to tampering potentially making it insecure for future guests. Also, the Wi-Fi information has to be shared with anyone who is setting up devices locally at the property. Currently, devices connect either to Wi-Fi (e.g. using a Wi-Fi password) or a multi-protocol access point. This makes them vulnerable to hacking unless special care is taken to isolate devices in their own separate virtual network. Which then leads to management challenges due to complexity. There are several guides and instructions available for owners to secure their network. There are no turn-key solutions.

SUMMARY OF THE INVENTION

In one aspect, a computerized method for guaranteed key delivery of a digital key code to a smart lock comprising: providing a plurality of smart locks, wherein the plurality of smart locks are communicatively coupled in a local area network, and wherein a key code; transmitting, via the local area network, a digital key code to a smart lock in the plurality of smart locks; and verifying a presence of the transmitted code in the lock once the transmission is performed.

Figure 1:
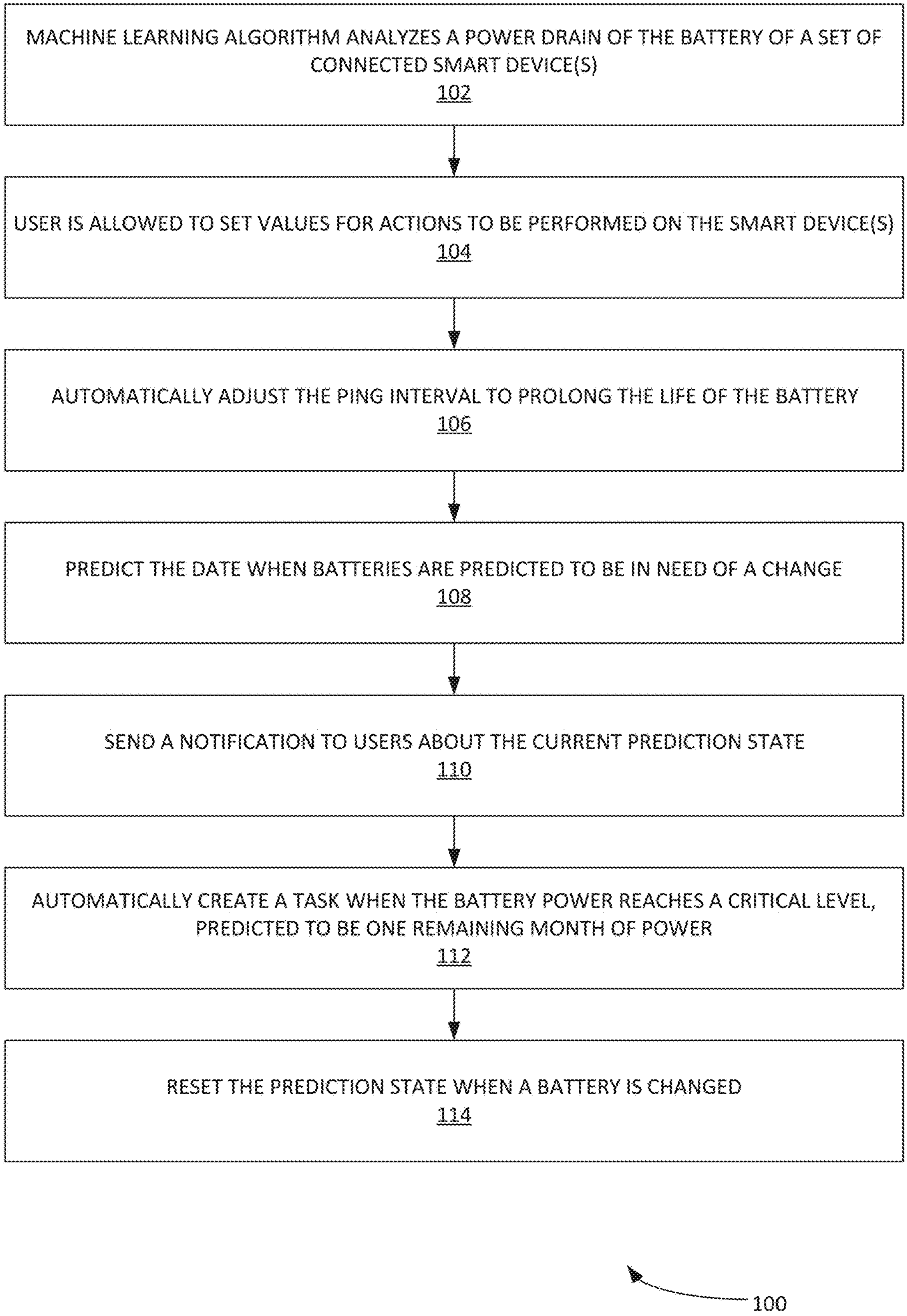
FIG. 1 illustrates an example process for adaptive power smart-device monitoring, according to some embodiments.

The Figures described above are a representative set and are not exhaustive with respect to embodying the invention.

DESCRIPTION

Disclosed are a system, method, and article of manufacture for guaranteed digital key code delivery to a smart lock in a smart-device network. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided. These definitions are provided by way of example and not limitation.

LoRa (from "long range") is a physical radio communication technique. LoRa is based on spread spectrum modulation techniques derived from chirp spread spectrum (CSS) technology.

LoRaWAN is a cloud-based medium access control (MAC) layer protocol but acts mainly as a network layer protocol for managing communication between LPWAN gateways and end-node devices as a routing protocol.

Heartbeat can be a periodic signal to indicate normal operation or to synchronize parts of a system.

Internet of things (IoT) describes physical objects (or groups of such objects) with sensors, processing ability, software, and other technologies that connect and exchange data with other devices and systems over the Internet or other communications networks.

Wi-Fi is a family of wireless network protocols, based on the IEEE 802.11 family of standards. Wi-Fi can be used for local area networking of devices and Internet access, allowing nearby digital devices to exchange data by radio waves.

Machine learning is a type of artificial intelligence (AI) that provides computers with the ability to learn without being explicitly programmed. Machine learning focuses on the development of computer programs that can teach themselves to grow and change when exposed to new data.

Smart lock is an electromechanical lock which is designed to perform locking and unlocking operations on a door when it receives such instructions from an authorized device using a wireless protocol and a cryptographic key to execute the authorization process. A smart lock can also monitor access and sends alerts for the different events it monitors and some other critical events related to the status of the device.

Software as a service (SaaS) is a software licensing and delivery model in which software is licensed on a subscription basis and is centrally hosted.

Exemplary Methods

Present methods can be utilized in the context of a system of connected devices. These can be smart devices used to connect a plurality of the hospitality/lodging units (e.g. homestay rental units, vacation rentals, tourism-related building rentals, etc.). The methods can address the various problem statements provided in the Background section supra.

FIG. 1 illustrates an example process for adaptive power smart-device monitoring, according to some embodiments. In step 102, a machine learning algorithm analyzes a power drain of the battery of a set of connected smart device(s). In step 104, a user is allowed to set values for actions to be performed on the smart device(s). These values can include, inter alia: the frequency at which they expect to change batteries and also the ping interval, etc.

In step 106, based on the power drain that is observed, process 100 can automatically adjust the ping interval to prolong the life of the battery. Process 100 can use a web based and/or mobile device application to interface with the user. In step 108, based on the power drain, process 100 can predict the date when batteries are predicted to be in need of a change. This prediction can change daily based on the observed and calculated drain (e.g. as process 100 obtains information on a periodic basis, etc.).

In step 110, process 100 can send a notification to users about the current prediction state. In step 112, process 1000 can automatically create a task when the battery power reaches a critical level, predicted to be one remaining month (e.g. user definable) of power. In step 114, process 100 can reset the prediction state when a battery is changed (e.g. to a new fresh set of batteries).

Figure 2A:
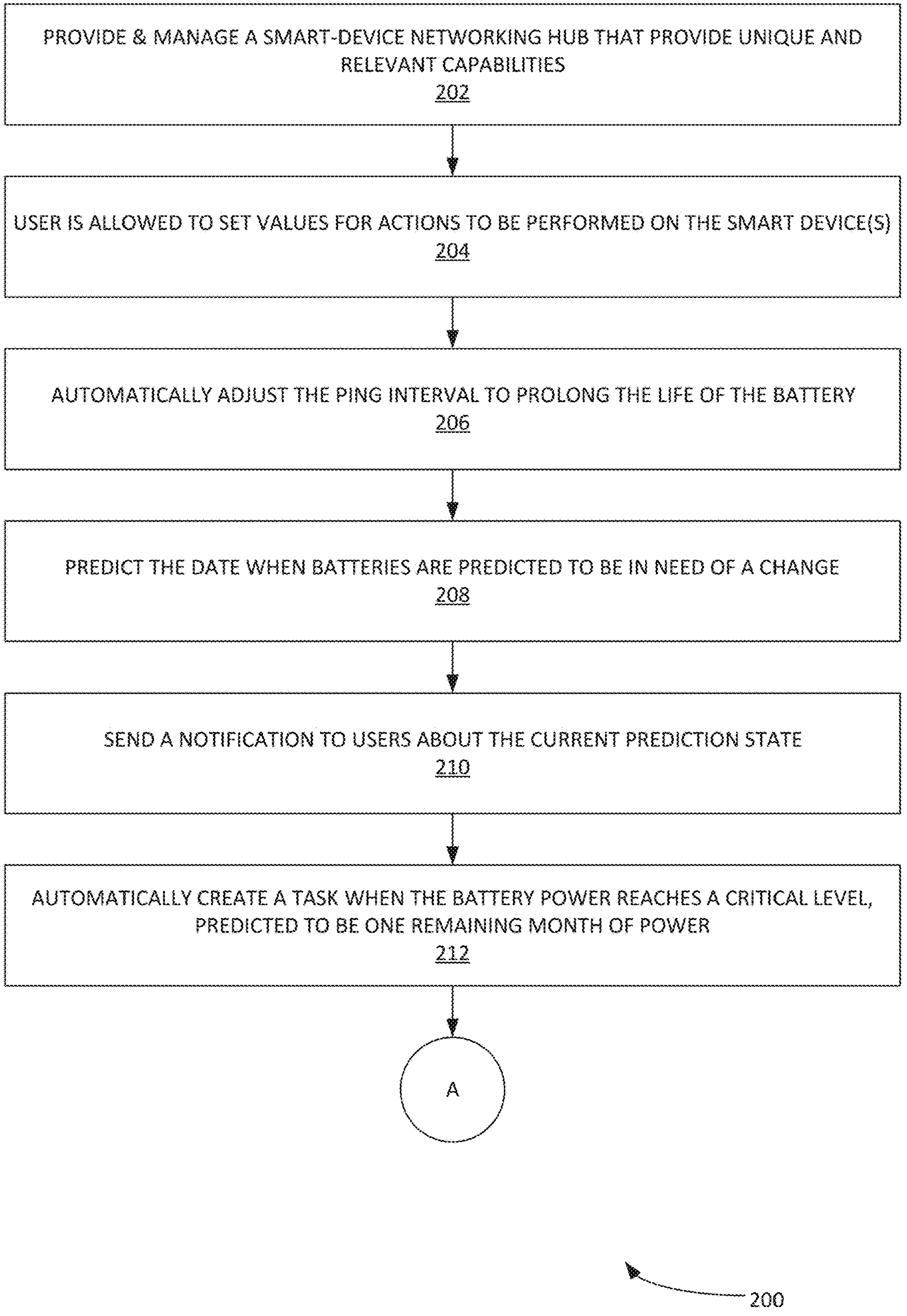
FIGS. 2A-B illustrate an example process for implementing and providing edge control of smart devices and policy management without connectivity, according to some embodiments.
Figure 2B:
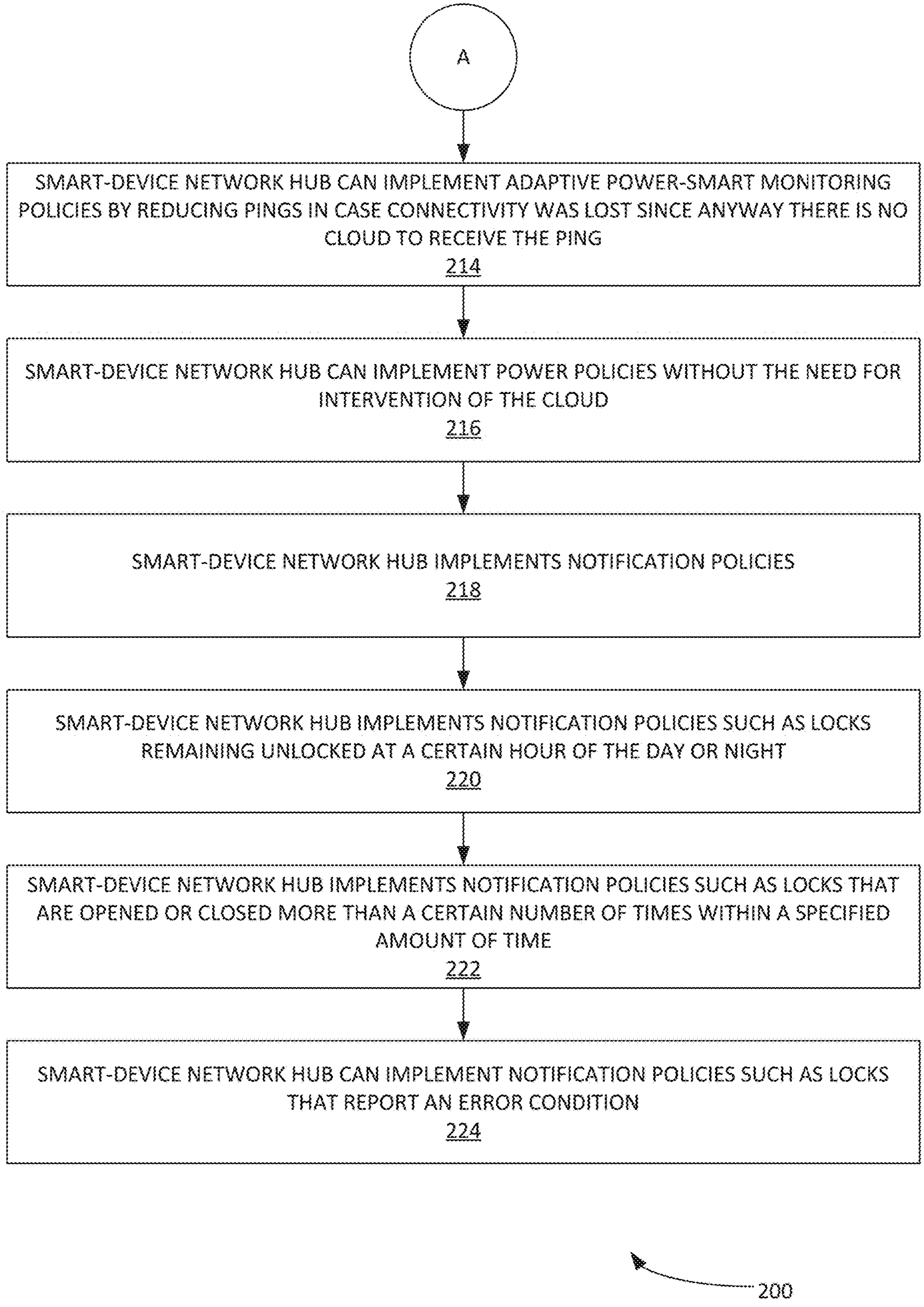

FIGS. 2A-B illustrate an example process 200 for implementing and providing edge control of smart devices and policy management without connectivity, according to some embodiments. In step 202, process 200 can provide and manage a smart-device networking hub (e.g. a set of servers and relevant functionalities and applications, etc.) that provide unique and relevant capabilities. In step 204, process 200 can provide policies for control and management of connected devices in a property or across a portfolio of properties that would be stored on the local hub with a time when they should be applied towards a particular device.

In step 206, process 200 can provide policies that are stored as simple lookup tables thus enabling hubs with low computing capabilities to provide smart features. In step 208, the smart-device network hub can apply new password codes on locks instantaneously (e.g. assuming computer processing and networking latency, etc.). In step 210, the smart-device network hub can apply this policy on devices even when connectivity to the smart-device platform cloud-computing platform is temporarily lost.

In step 212, the smart-device network hub maintains a local cache of pinged data and transmits that data once connectivity is restored. In step 214, the smart-device network hub can implement adaptive power-smart monitoring policies by reducing pings in case connectivity is lost since anyway there is no cloud to receive the pings. In step 216, the smart-device network hub can implement power policies without the need for intervention of the cloud. In step 218, the smart-device network hub can implement notification policies. These can include, inter alia: locks remaining unlocked beyond a certain number of minutes at any time.

In step 220, the smart-device network hub can implement notification policies such as locks remaining unlocked at a certain hour of the day or night. In step 222, the smart-device network hub can implement notification policies such as locks that are opened or closed more than a certain number of times within a specified amount of time. In step 224, the smart-device network hub can implement notification policies such as locks that report an error condition.

Figure 3:
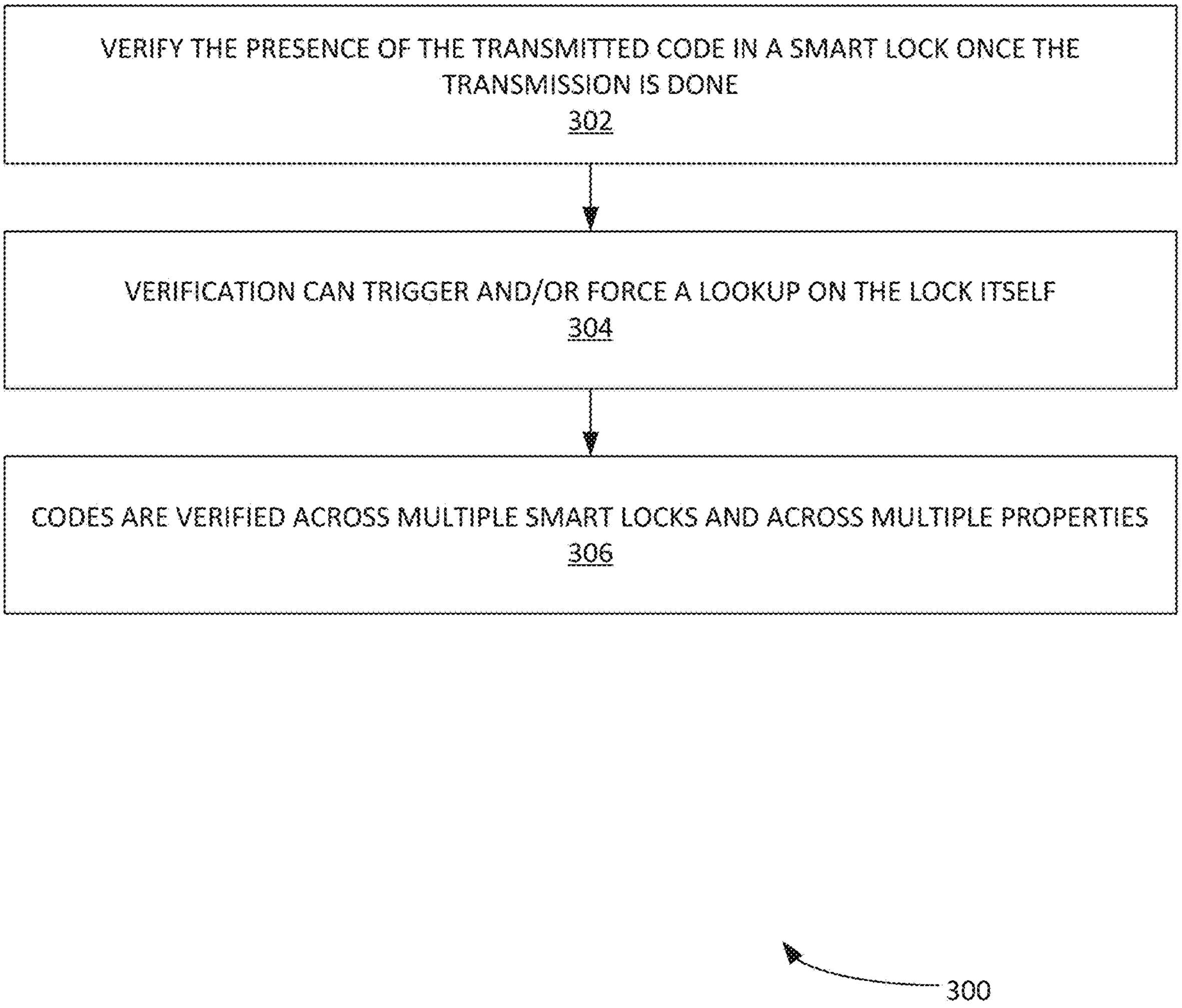
FIG. 3 illustrates an example process for guaranteed key delivery to smart locks, according to some embodiments.

FIG. 3 illustrates an example process for guaranteed key delivery to smart locks, according to some embodiments. In step 302, process 300 can verify the presence of the transmitted code in a smart lock once the transmission is done. In step 304, the verification can trigger and/or force a lookup on the lock itself. In this way, process 300 can negate the possibility that this might be a cached version on a cloud-platform based server. In step 306, the codes can be verified across multiple smart locks and across multiple properties.

In one example, smart lock can be an electromechanical lock that is designed to perform locking and unlocking operations on a door when it receives a prompt via an electronic keypad, biometric sensor, access card, Bluetooth, or Wi-FI from a registered mobile device. A smart lock can have an Internet communication and/or other local area network communication that enables access for users and enhanced security from intruders.

The components of a smart lock can include, inter alia: the physical lock, the key (e.g. can be electronic, digitally encrypted, or a virtual key to provide keyless entry), a secure Bluetooth or Wi-Fi connection, and a smart-lock management mobile application. Smart locks can also monitor access and send alerts in response to the different events it monitors as well as other critical events related to the status of the device. Smart locks and/or the management mobile application can be served by a smart-lock management cloud server. The smart-lock management server can communicate to a specific set of smart locks via the Internet and/or a relevant LAN.

Process 300 can eliminate the problem of non-working codes in smart locks. Process 300 can also ensure the presence of an emergency code in every connected lock.

Figure 4:
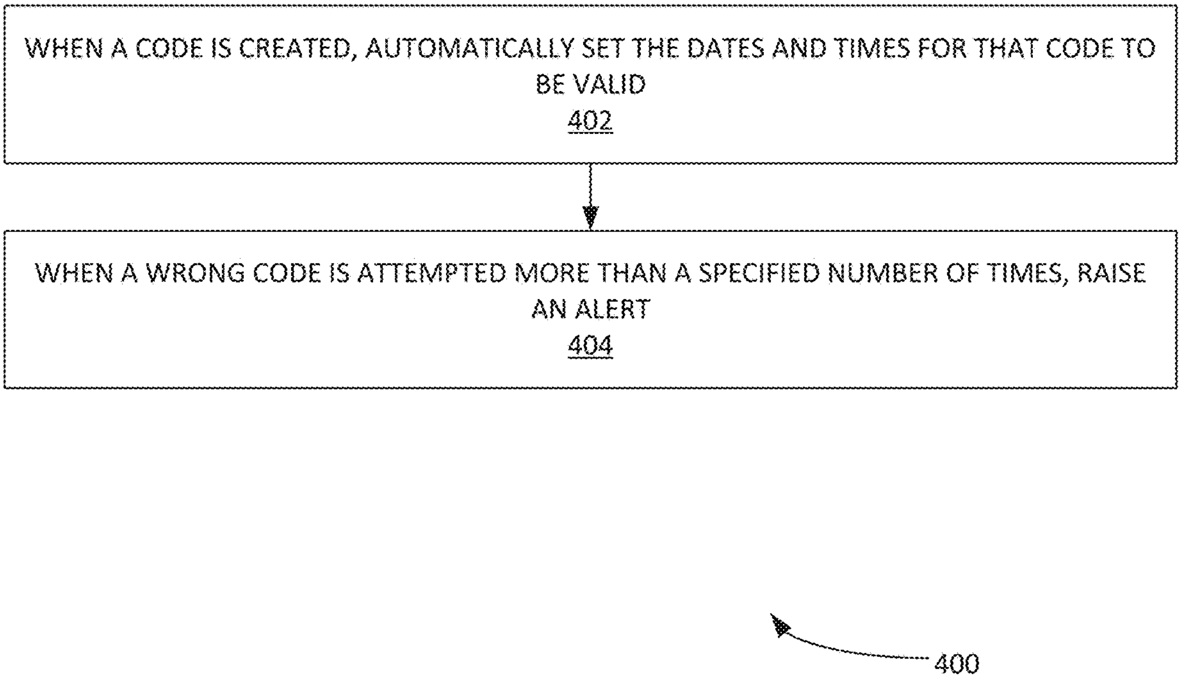
FIG. 4 illustrates an example process for managing a smart-lock code with secure key notification, according to some embodiments.

FIG. 4 illustrates an example process 400 for managing a smart-lock code with secure key notification, according to some embodiments. In step 402, when a code is created, process 400 can automatically set the dates and times for that code to be valid. In step 402, through monitoring, when the code is used outside of certain hours, process 400 can send a notification alert. It is noted that while it is possible to deactivate a code outside of hours, it is probably not safe to do so. Hence the alert mechanism is utilized. In step 404, when a wrong code is attempted more than a specified number of times, process 400 can raise an alert. Process 400 can also activate other devices that are connected such as turning on lights and starting up a camera.

Figure 5:
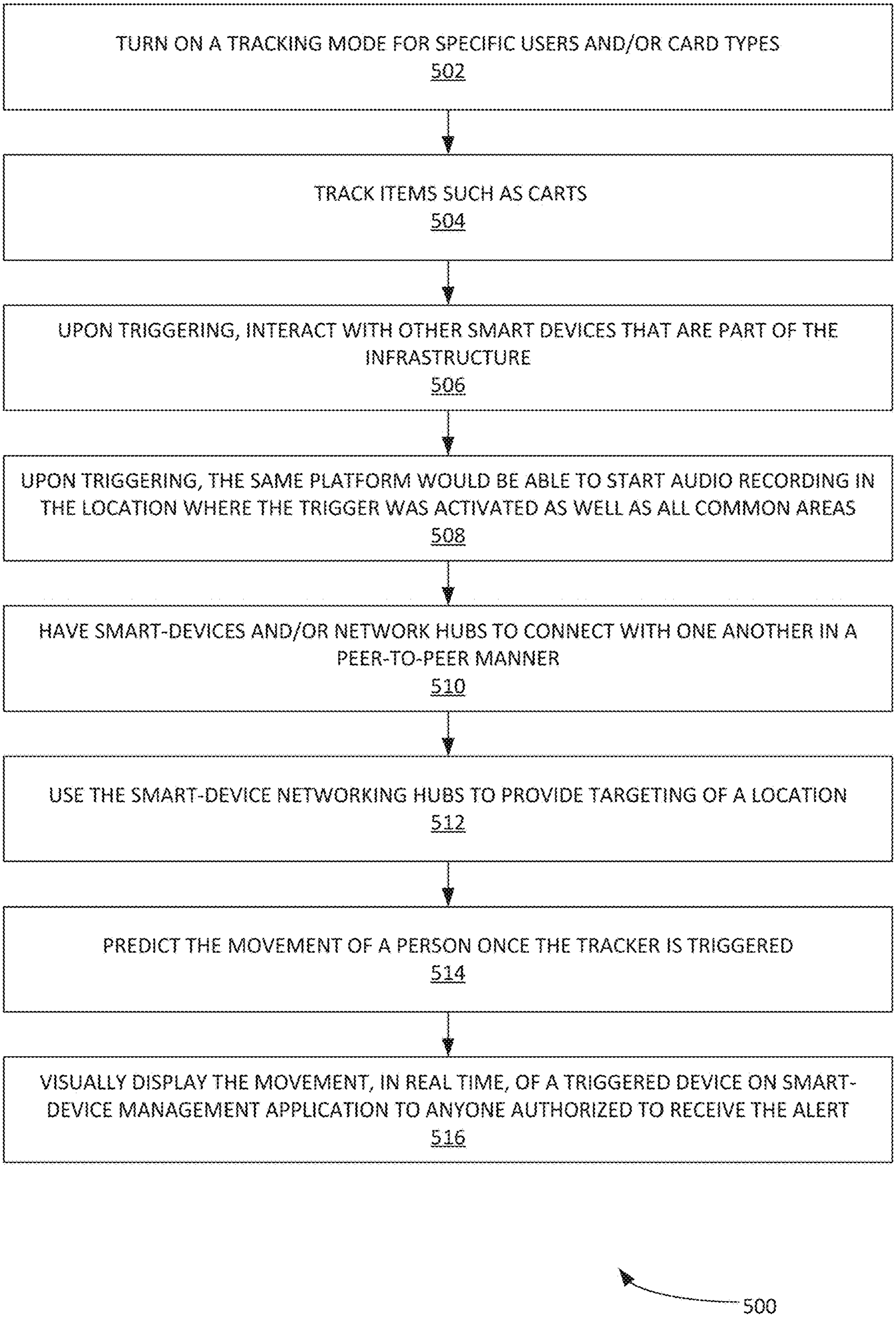
FIG. 5 illustrates an example process for secure tracking smart devices, according to some embodiments.

FIG. 5 illustrates an example process 500 for secure tracking smart devices, according to some embodiments. In step 502, process 500 can turn on a tracking mode for specific users and/or card types. This can enable specified users to have trackers that are only activated when they are triggered, while for others tracking can be available all the time. In step 504, process 500 can be used to track items such as carts. In step 506, upon triggering, process 500 can interact with other smart devices that are part of the infrastructure. These can include, inter alia: such as turning on lights, activating cameras, setting lights to specific colors, or unlocking doors (e.g. common doors and/or exits).

In step 508, upon triggering, the same platform would be able to start audio recording in the location where the trigger was activated as well as all common areas. Audio recordings can be pushed to an applicable server. In step 510, process 500 can have smart-devices and/or network hubs to connect with one another in a peer-to-peer manner. In this way, process 500 can auto detect a smart-device network hub that is not working and/or is not working in a correct manner. Process 500 can automatically raise an alert for correction of the error and until such time the hubs would work around the error situation. In step 512, process 500 can use the smart-device networking hubs to provide targeting of a location. These can be, for example, a specific room, in a corridor, to within two rooms, etc.

In step 514, process 500 can predict the movement of a person once the tracker is triggered. In step 516, process 500 can visually display the movement, in real time, of a triggered device on smart-device management application to anyone authorized to receive the alert.

It is noted that in one example embodiment, process 500 can detect if someone were to set authorization codes on a lock through any external means including by directly accessing the lock. In this way, process 500 can determine the difference between codes that it created on a lock and codes that were created by other means. This can be the detection of a hack or spoof. Once such a code is detected, in a manner similar to a malware detector, process 500 can raise an alert, process 500 can wipe all codes from that lock and restore only valid codes.

Figure 6:
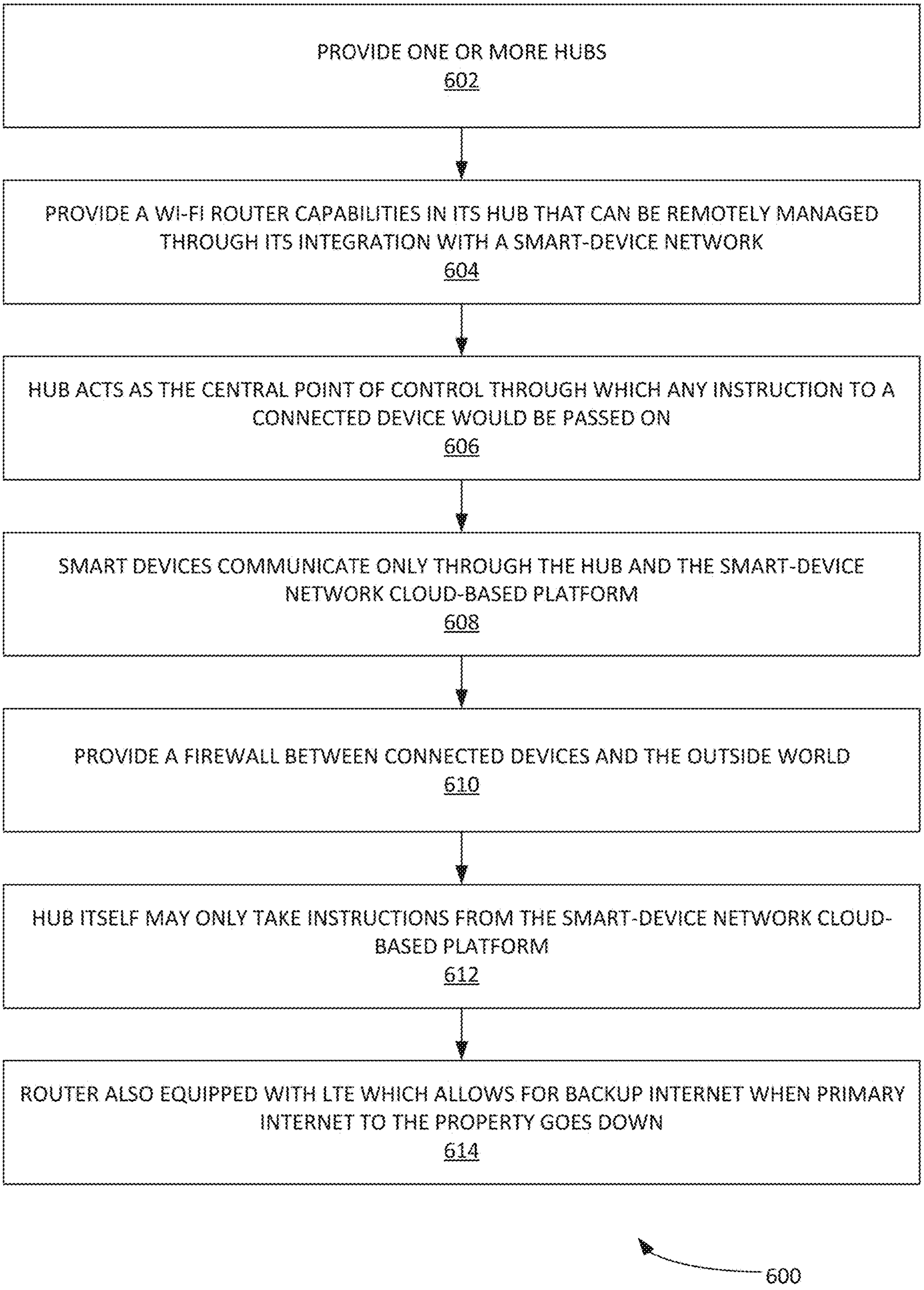
FIG. 6 illustrates an example process implementing localized smart-device hubs, according to some embodiments.

FIG. 6 illustrates an example process implementing localized smart-device hubs, according to some embodiments. In step 602, process 600 can provide one or more hubs. These hubs can include various smart devices. It is expected that there can be one hub in each room and/or one hub per 3-4 rooms in common areas. For short-term rentals there can be one or more such hubs per property. For multi-family units there can be a structure of hubs similar to that which is used in a hotel context.

In step 604, process 600 can provide Wi-Fi router capabilities in its hub that can be remotely managed through its integration with a smart-device network. In step 606, the hub can act as the central point of control through which any instruction to a connected device would be passed on. In step 608, smart devices can communicate only through the hub and the smart-device network cloud-based platform. Using smart IoT devices can allow for automatic configuration and onboarding without divulging Wi-Fi passwords. This step can be completely automatic and not utilize a human installer.

In step 610 process 600 can provide a firewall between connected devices and the outside world. In step 612, the hub itself may only take instructions from the smart-device network cloud-based platform. Any communication to a device anywhere on the network would be brokered through the smart-device network cloud-based platform (e.g. if cloud connectivity was present) and/or by the hub itself (e.g. using the locally stored policy information). This architecture can ensure that external hacking of connected devices may be difficult as its access control policies are always obeyed (e.g. whether or not there was cloud connectivity).

In step 614, the router can also be equipped with LTE which allows for backup internet when primary internet to the property goes down.

Example Systems

Figure 7:
FIG. 7 illustrates an example smart-device networking and management system, according to some embodiments.

FIG. 7 illustrates an example smart-device networking and management system 700, according to some embodiments. Smart-device networking and management system 700 can use SaaS and/or mobile applications to provide a single pane of glass to manage, secure and automate devices across a property or portfolio for property managers, hospitality IT services staff and operational staff. Smart-device networking and management system 700 can provide a cloud and mobile scalable platform. Smart-device networking and management system 700 can provide a heterogeneous infrastructure with consumer grade ease of use and be delivered as a suite of modular applications on a common platform. Smart-device networking and management system 700 can provide flexible pricing aligned to needs of the hospitality industry.

Machine Learning

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression, and other tasks, which operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, which is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consists of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (for example in cross-validation), the test dataset is also called a holdout dataset.

Additional Computing Systems

Figure 8:
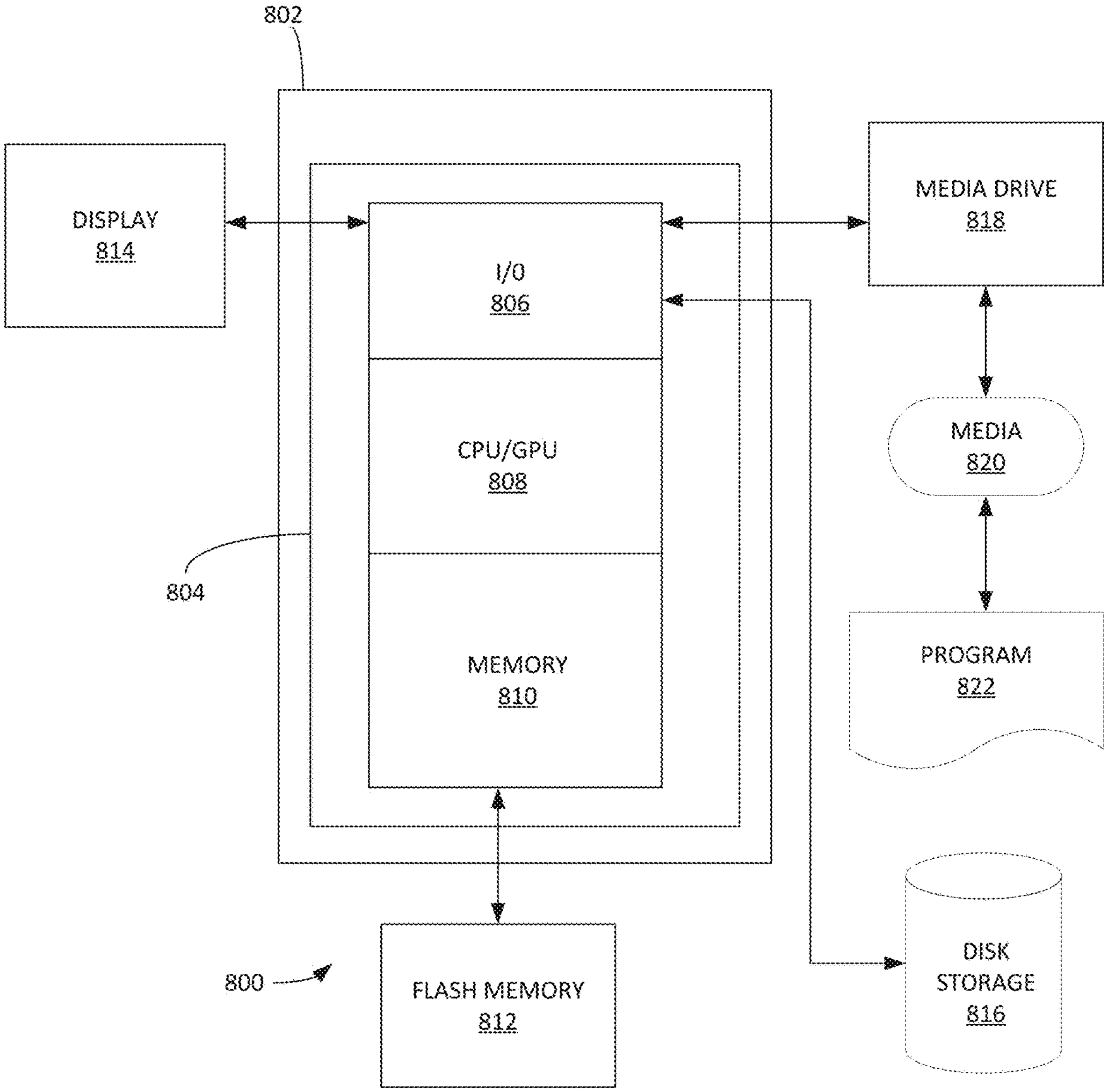
FIG. 8 depicts an example computing system that can be configured to perform any one of the processes provided herein.

FIG. 8 depicts an exemplary computing system 800 that can be configured to perform any one of the processes provided herein. In this context, computing system 800 may include, for example, a processor, memory, storage, and I/O devices (e.g., monitor, keyboard, disk drive, Internet connection, etc.). However, computing system 800 may include circuitry or other specialized hardware for carrying out some or all aspects of the processes. In some operational settings, computing system 800 may be configured as a system that includes one or more units, each of which is configured to carry out some aspects of the processes either in software, hardware, or some combination thereof.

FIG. 8 depicts computing system 800 with a number of components that may be used to perform any of the processes described herein. The main system 802 includes a motherboard 804 having an I/O section 806, one or more central processing units (CPU) 808, and a memory section 810, which may have a flash memory card 812 related to it. The I/O section 806 can be connected to a display 814, a keyboard and/or another user input (not shown), a disk storage unit 816, and a media drive unit 818. The media drive unit 818 can read/write a computer-readable medium 820, which can contain programs 822 and/or databases. Computing system 800 can include a web browser. Moreover, it is noted that computing system 800 can be configured to include additional systems in order to fulfill various functionalities. Computing system 800 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

ADDITIONAL EMBODIMENTS

Figure 9:
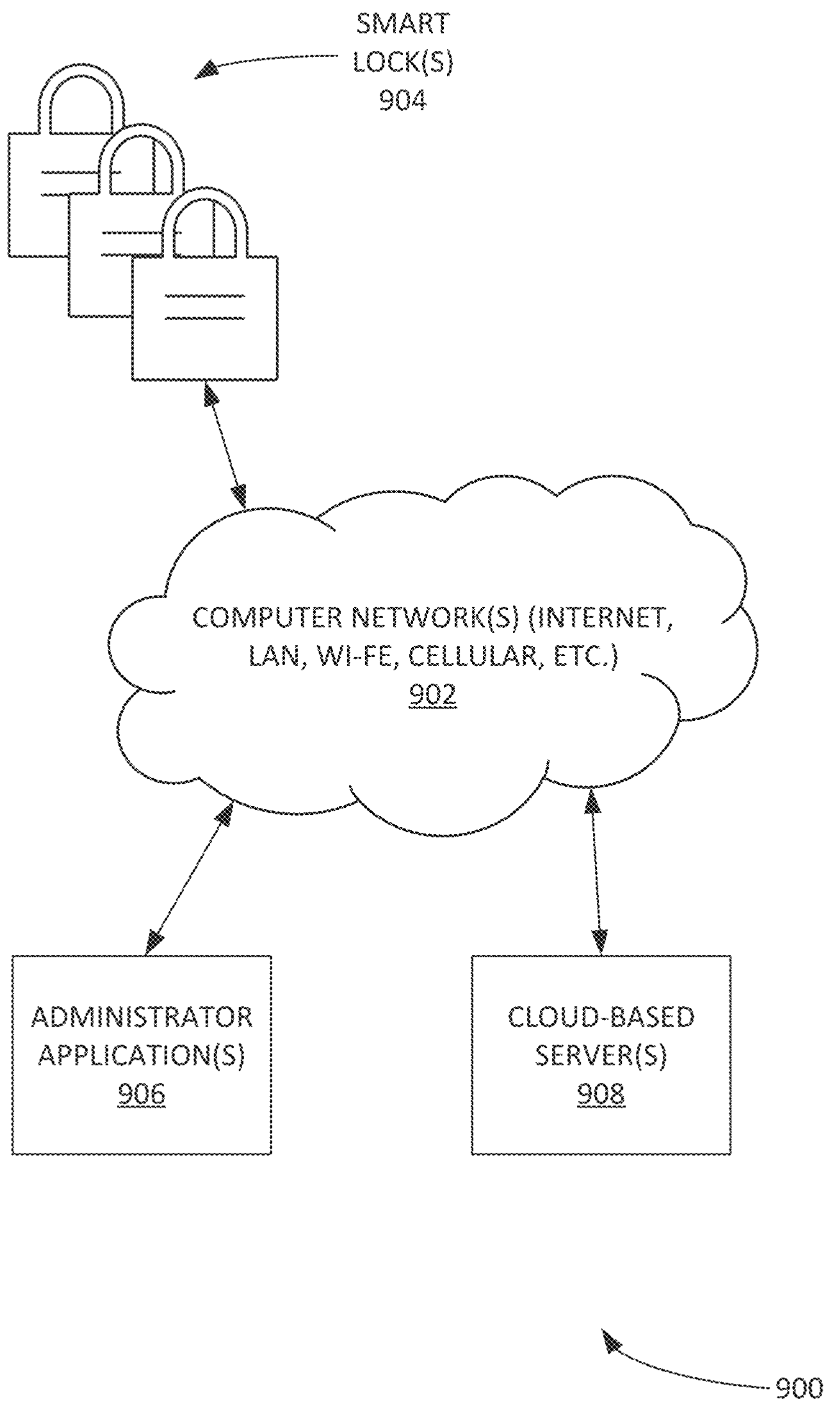
FIG. 9 illustrates an example smart lock management system, according to some embodiments.

FIG. 9 illustrates an example smart lock management system 900, according to some embodiments.

Smart lock management system 900 can provide guaranteed key delivery of a digital key code to a smart lock is provided. Smart lock management system 900 can provide a plurality of smart locks. The plurality of smart locks are communicatively coupled in a local area network, and wherein a key code. Smart lock management system 900 can transmit, via the local area network, a digital key code to a smart lock in the plurality of smart locks (e.g. smart locks 904, etc.). Smart lock management system 900 can verify the presence of the transmitted code in the lock once the transmission is performed. Smart lock management system 900 can detect that the digital key code is absent in the smart lock. Smart lock management system 900 can automatically restore the digital key code in the smart lock. Smart lock management system 900 can detect if a user and/or other party set codes by directly accessing the device itself in order to gain access as well.

Smart lock management system 900 can provide a cloud service (e.g. in cloud-based servers 908) maintains in a database. Here, a list of all key codes that are generated. In other words, for a given property, the entire list of all codes which should be present to activate each of the locks, is maintained in the database. Smart lock management system 900 also has a configurable "heartbeat". This "heartbeat" is the setting which tells cloud-based servers 908, the frequency at which it should be verifying the presence of all codes within each of the locks. To determine whether a lock is online or offline, cloud-based servers 908 reserves one code location on the lock for itself. It then sets a "dummy" code, followed by deletion of the dummy code. If these actions are both positive, then cloud-based servers 908 knows that the device is online. Once cloud-based servers 908 determine that the device is online, it then queries the lock for the list of codes. Locks do not return actual codes. Rather when a code is set, the lock creates a unique label for each of the codes. Cloud-based servers 908 compare the labels and thereby ensures that its knowledge of the labels matches that of the lock. Administrators can use it to access the functionalities of system 900 and/or cloud-based servers 908.

Moreover, cloud-based servers 908 provides role-based access controls across an entire portfolio of devices (e.g. smart locks 902, other IoT devices, etc.). Cloud-based servers 908 enables an administrator to establish policies. These policies can automatically orchestrate functionality not only within and across properties/portfolio, but also across devices. For example, a policy might be: "IF the guest checks out, THEN turn thermostat to 68 degrees AND turn room lights off". Another example might be: "IF a panic button is triggered THEN turn on lights in that zone to full brightness AND unlock all doors".

Cloud-based servers 908 enable various personalization operations/functionalities as well. Cloud-based servers 908 not only captures information on the usage of various devices, but also about the users that are interacting with the devices. This enables cloud-based servers 908 to build a profile of the preferences of a user. Cloud-based servers 908 can track and enable personalization across different websites. Cloud-based servers 908 can be able to enable personalization of a user across various devices.

Figure 10:
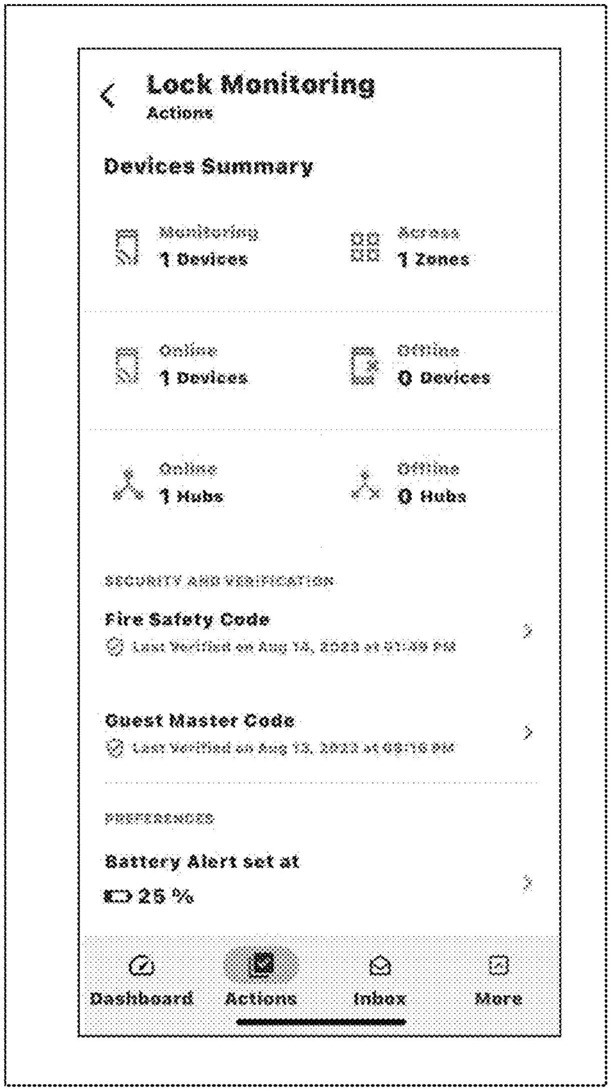
FIGS. 10-12 illustrate example screenshots showing example cloud-based server functionalities, according to some embodiments.
Figure 11:
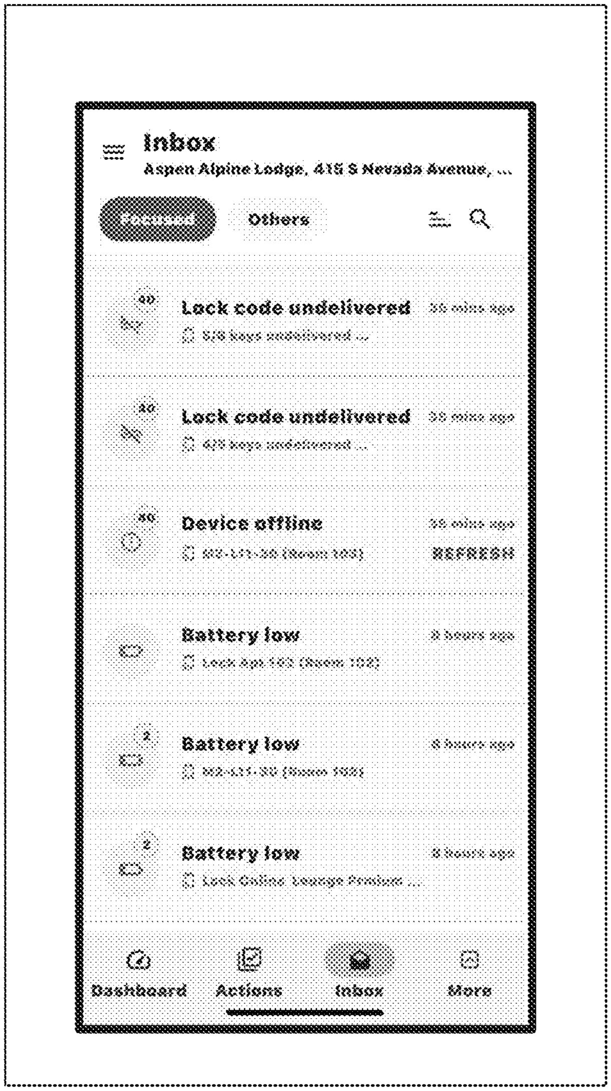
Figure 12:
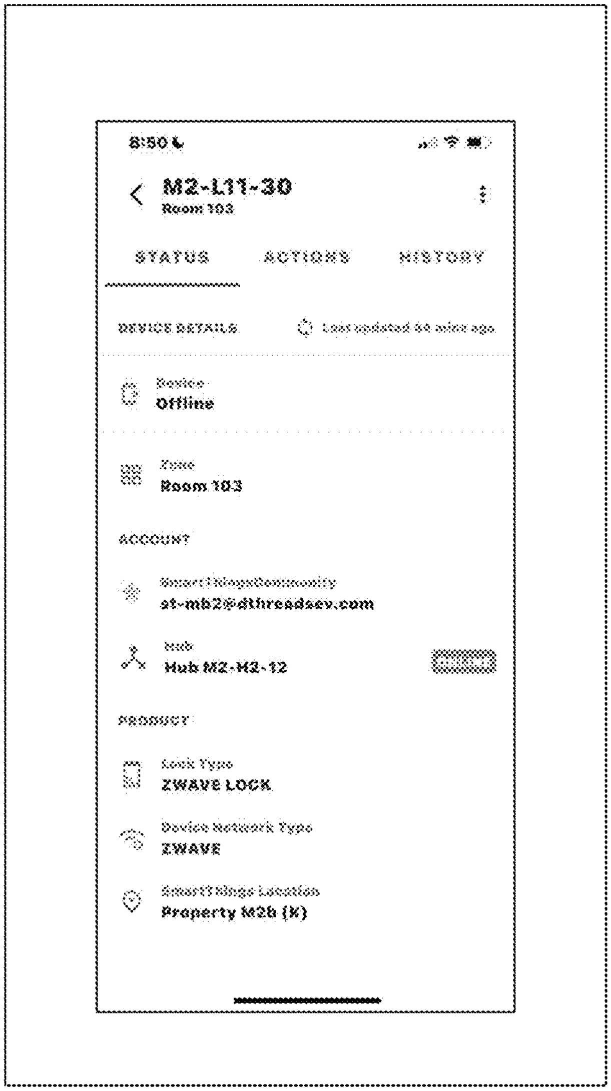

FIGS. 10-12 illustrate example screenshots 1000-1200 showing example cloud-based server functionalities, according to some embodiments.

CONCLUSION

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) and/or some specialized application-specific language (PHP, JavaScript, XML, JSON). It is noted that JavaScript has been used as an example in several embodiments. However, in other embodiments, another scripting language and/or JavaScript variant can be utilized as well.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

What is claimed is:

1. A computerized method for guaranteed key delivery of a digital key code to a smart lock comprising:
- providing a plurality of smart locks, wherein the plurality of smart locks are communicatively coupled in a local area network, and each smart lock of the plurality of smart locks is configured to store the digital key code;
- transmitting, via the local area network, the digital key code to the smart lock in the plurality of smart locks, and wherein the verifying comprises forcing a lookup on the target smart lock that negates a cached version of the digital key code on a cloud-computing server used to manage delivery of the digital key code to the plurality of smart locks; and
- verifying a presence of the transmitted code in the lock once the transmission is performed;
- detecting that the digital key code is absent in the smart lock; and
- automatically restoring the digital key code in the smart lock,
- wherein the step of verifying a presence of the transmitted code in the lock once the transmission is performed by forcing a lookup on the smart lock,
- wherein a plurality of digital key codes are verified across multiple smart locks of the plurality of smart locks,
- wherein the plurality of smart locks are installed across a plurality of geographical locations, and
- wherein a periodicity of the verifying is based on a heartbeat operation.

2. The computerized method of claim 1, wherein a plurality of types of digital key codes are utilized.

3. The computerized method of claim 2, wherein the plurality of types of digital key codes a guest code, a staff code, a vendor code, an emergency code.

4. The computerized method of claim 3, wherein the plurality of types of digital key codes are simultaneously validated for a presence in the plurality of smart locks.

5. The computerized method of claim 4, further comprising ensuring the presence of an emergency code in every smart lock of the plurality of smart locks, wherein the emergency code provides access during system failures or connectivity loss.

6. The computerized method of claim 5, wherein the plurality of smart locks are communicatively coupled to the local area network through a smart-device networking hub that provides control and management of the plurality of smart locks.

7. The computerized method of claim 6, wherein the smart-device networking hub applies policies for control of the plurality of smart locks even when connectivity to a smart-device platform cloud-computing platform is temporarily lost.

8. The computerized method of claim 7, wherein the smart-device networking hub maintains a local cache of device status data and transmits the device status data once connectivity to the smart-device platform cloud-computing platform is restored.

9. The computerized method of claim 8, wherein a machine learning algorithm analyzes power drain of batteries in the plurality of smart locks and automatically adjusts ping intervals to prolong battery life.

10. The computerized method of claim 9, wherein the plurality of smart locks are configured to manage smart devices for hospitality units including homestay rental units, vacation rentals, and tourism-related building rentals.

11. The computerized method of claim 10, further comprising raising an alert notification when a digital key code is repeatedly entered outside of authorized hours or when a wrong code is attempted more than a specified number of times.

12. The computerized method of claim 11, wherein the smart-device networking hub stores policies as lookup tables and applies new password codes on the plurality of smart locks instantaneously.

* * * * *